July 11, 1967

B. N. PARKER

3,331,026

ELECTRONIC TRIGGER CIRCUIT PEAK DETECTING AND INHIBITING MEANS

Filed Feb. 28, 1964

Inventor
Barry Norman Parker
By
Kenyon, Palmer, Stewart & Estabrook
Attorneys

United States Patent Office 3,331,026
Patented July 11, 1967

3,331,026
ELECTRONIC TRIGGER CIRCUIT PEAK DE-
TECTING AND INHIBITING MEANS
Barry Norman Parker, Richmond, England, assignor to
Crosfield Electronics Limited, a British company
Filed Feb. 28, 1964, Ser. No. 348,074
Claims priority, application Great Britain, Mar. 4, 1963,
8,552/63
3 Claims. (Cl. 328—150)

This invention relates to trigger circuits and more particularly to circuits for supplying outut signals in response to the receipt of input pulses with well defined peak values. A common example of pulses filling the noted requirement are pulses having a substantially sinusoidal shape. In pulses of this type, the voltage level of the input waveform varies continuously in the region of the peaks.

According to the present invention input pulses which vary continuously in the region of their peaks are applied to a comparator by and through a pair of input circuits, one of the input circuits including a delay device for delaying the input pulses relative to the other of said input circuits by an interval which is short compared with the duration of said pulses. The comparator is arranged to supply an output signal when the amplitude of an input pulse which it has received via the circuit including the delay device is equal to the amplitude of the corresponding input pulses which it has received from the other of the input circuits.

Where the delay introduced is short, this system provides output pulses substantially coincident with the peak values of the input pulses, lagging the input pulses only by an interval equal to half the length of the delay introduced by the delay device in the case of a pulse which is symmetrically shaped about its peak. By adjusting the biasing polarities of the comparator the peaks of either positive or negative input pulses can be detected.

Systems embodying the invention are particularly useful in waveform recognition circuits used in magnetic character reading, for example, in which the peak positions are frequently the most reliable characteristic of the waveform to identify and these systems being phase sensitive are substantially independent of amplitude variation. If trigger pulses indicating the presence of both positive and negative peaks in the input waveform are required, complementary circuit responsive to the positive and negative peaks respectively can be provided, receiving the same direct and delayed input signals and having their operation interlocked by means of a bistable circuit serving to inhibit the operation of each in turn. Such a magnetic character recognition system is described in the applicant's co-pending patent application Ser. No. 522,067 for Identification of Digital Signals Resulting from Scanning Recorded Characters, filed Jan. 21, 1966.

A particular example of a circuit embodying the invention for generating output pulses representing the positions of positive and negative peaks of an input signal which is substantially sinusoidal will be described with reference to the accompanying drawings, in which.

Figures 1, 2:
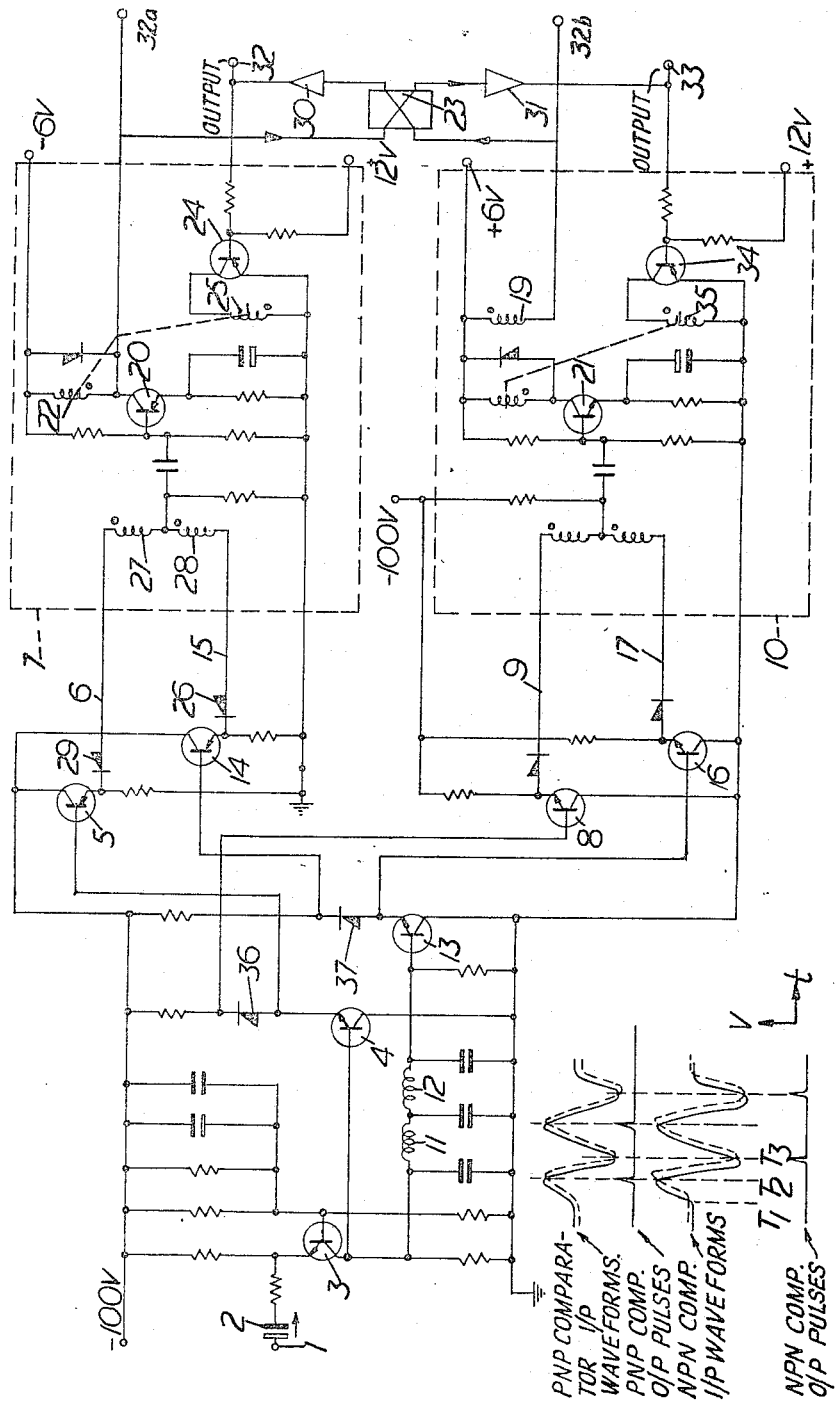
FIGURE 1 is a circuit diagram of the example to be described.
FIGURE 2 is a waveform diagram showing the input and output signals of the two comparators of the circuit of FIGURE 1.

Referring first to FIGURE 1, the input signal to the circuit is applied to the terminal 1 connected via a capacitor 2 and a resistor to the emitter electrode of a rectifying N-P-N transistor 3. The collector of transistor 3 is connected firstly via a pair of emitter-follower transistors 4 and 5 to the input line 6 of a transistor blocking oscillator comparator circuit 7 and similarly via emitter-follower transistors 4 and 8 to the input line 9 of a transistor blocking oscillator comparator 10 and secondly via a delay line comprising inductance windings 11 and 12 and emitter-follower transistors 13 and 14 to supply a delayed input to input line 15 of comparator circuit 7 and similarly via emitter-follower transistors 13 and 16 to supply a delayed signal to input line 17 of comparator circuit 10. The input signals applied respectively to lines 6 and 9 of comparator circuits 7 and 10 respectively and lines 15 and 17 are shown in the first and third lines of FIGURE 2, the direct input signals applied to lines 6 and 19 being shown in continuous lines and the delayed input signals applied to lines 15 and 17 being shown in broken lines and the delay between the respective signals being short compared with the period of oscillation.

Comparator circuit 7 which includes a P-N-P transistor 20 is arranged to detect the cross-over points between the positive peaks of the direct and delayed input signals applied to lines 6 and 15 respectively while comparator circuit 10 including an N-P-N transistor 21 is arranged to detect the cross-over points between the negative peak of the direct and delayed input signals applied to lines 9 and 17 respectively. The two circuits however are complementary and the operation will be described with reference to comparator circuit 7.

A biasing voltage is derived across diode 36 ensuring that the direct input signal applied to the base electrode of transistor 5 and hence to input line 6 of P-N-P comparator has a DC voltage which is greater by a predetermined amount than the delayed input signal applied to the base of transistor 14, and hence to input line 15 of comparator 7. Similarly a biasing voltage derived across diode 37 ensures that the direct input signal applied to the base electrode of transistor 8 and hence to input line 9 of N-P-N comparator 10 has a DC voltage which is less than that of the delayed input signal applied to comparator 10 by a similar predetermined amount. This prevents operation of the system in response to pulses of less then a given amplitude resulting, in a character reader for example, from the scanning of stray spots of magnetic ink not forming part of a character.

The P-N-P transistor 20 of comparator circuit 7 has a winding 22 connected in series with its collector electrode. The condition of a bistable circuit 23 is controlled by the comparator and an output signal from this bistable circuit in turn serves either to bottom or reverse bias transistor 24 in series with the collector electrode of which is an inhibit winding 25 electromagnetically coupled with the winding 22. As long as transistor 24 is bottomed by bistable circuit 23 a short circuit is reflected across winding 22 thus preventing generation of pulses by the oscillator. Assuming initially that the delayed input to the base of emitter-follower transistor 14 is more negative than the direct input to the base electrode of emitter-follower transistor 5, and that transistor 24 is reverse biased since its base electrode is held at earth potential due to bistable circuit 23 being in the reset condition, diode 26 is forward conducting clamping the junction of windings 27 and 28 at approximately the same potential as the delayed input signal applied to the base of transistor 14, diode 29 is reverse biased and winding 27 is inoperative. Since the relative sense of windings 22 and 28 is such that the circuit is non-regenerative, the comparator cannot generate an output pulse under these conditions. As the level of the direct input signal applied to the base of emitter-follower transistor 5 falls and becomes within a few millivolts of the delayed input signal applied to the base of emitter-follower transistor 14 current commences to flow through diode 29 and hence through winding 27 and diode 26 is reverse biased. Since the winding 27 is wound in the opposite sense to the winding 28 transistor 20 is regeneratively switched on forming a blocking oscillator configuration. The comparator circuit 7 would continue to generate output pulses at the collector electrode of transistor 20 for application to the bistable circuit 23 until the direct input signal applied to the base of transistor 5 rises above the delayed input signal applied to the base of transistor 14 except that the first pulse generated causes the bistable circuit 23 to assume its set state and apply a negative output signal to the base of transistor 24. This negative output signal bottoms transistor 24 causing a very low impedance to be reflected across winding 22 which prevents the circuit from generating further output pulses.

The N-P-N comparator circuit 10 operates in a similar manner producing an output pulse when the delayed and direct input signals to the circuits cross in the vicinity of a negative peak. Winding 19 is employed to give a positive output pulse. The bistable circuit 23 effectively interlocks the operation of the P-N-P transistor comparator 7 and the N-P-N transistor comparator 10 so that the former generates a single output pulse adjacent to each positive peak of the input signal and the latter generates a single output pulse adjacent to each negative peak of the input signal. Referring again to the application of a circuit of this type to a magnetic character identification system, the circuit can be arranged to generate pulses coincident with the scanning of the leading and trailing edges of successive bars of a character. These pulses are applied to the interlocking bistable circuit 23 which consequently generates output signals representing the exact bar structure of the character scanned. A pair of buffer amplifiers 30 and 31 are included in the output lines of the bistable circuit 23 and the square wave output signals from the peak detector system described are taken from the terminals 32 and 33. Short duration output pulses from comparator circuits 7 and 10 indicating the detection respectively of positive and negative peaks in the input waveforms may be taken from the terminals 32a and 33a.

These signals are illustrated in the second and fourth lines of FIGURE 2. Initially, in the absence of an input signal both the comparators 7 and 10 are in a non-regenerative state. Assuming that the interlocking bistable circuit 23 is in the reset state, transistor 24 of P-N-P comparator 7 is cut-off and transistor 34 of N-P-N transistor comparator 10 is bottomed causing the comparators 7 and 10 to be in uninhibited and inhibited states respectively. The circuit remains in this state until instant T1 of the input waveform (see FIGURE 2) when the direct input waveform applied to the base of transistor 8 becomes positive with respect to the delayed input waveform applied to the base of transistor 16, whereupon the N-P-N transistor comparator 10 changes to a regenerative state but is unable to generate an output pulse since its inhibit winding 35 is energised. The circuit remains in this state until instant T2 when the direct waveform applied to the base of transistor 5 becomes negative with respect to the delayed waveform applied to the base of transistor 14 causing the P-N-P transistor comparator 7 to generate an output pulse switching the linking bistable circuit 23 to its set state preventing the generation of a further output pulse. The setting of bistable circuit 23 removes the inhibiting potential from the base of transistor 34 of N-P-N transistor comparator 10, but the direct and delayed waveforms applied to the bases of transistors 8 and 16 are now such that the N-P-N transistor 10 is in a non-regenerative state. The circuit remains in this condition until instant T3 when the base of transistor 8 becomes positive with respect to the base of transistor 16 and the N-P-N transistor comparator 10 generates an output pulse which triggers bistable circuit 23 back to its reset state, inhibiting the generation of a further output pulse by comparator 10. The resetting of bistable circuit 23 de-energises the inhibit winding 25 of transistor comparator 7, but the waveforms are such that this comparator is a non-regenerative state.

The comparator circuits described are of the blocking oscillator type, but other types of comparator could also be used.

I claim:
1. A circuit for generating output signals that are representative of the occurrence of peak values of input pulses of more than a predetermined value in an input waveform, where said input waveform includes a number of input pulses having well defined peaks in the region of which the D.C. value of the waveform varies continuously, the circuit comprising:

a comparator circuit;
a first circuit operatively connected to a first input of said comparator circuit, said input waveform being applied to an input terminal of said first circuit;
a second circuit operatively connected to a second input of said comparator circuit, said input waveform being applied to an input terminal of said second circuit, said second circuit including means for delaying the application of said waveform to said second input of said comparator circuit;
bias means operatively connected to said inputs of said comparator circuit for introducing a predetermined D.C. voltage difference between the signals applied by said first and second circuits to said comparator circuit, and for preventing the occurrence of an equality in the instantaneous values of the first and second input signals to the comparator circuit unless the input pulses of the input waveform are of more than the said given intensity, said comparator circuit including means for comparing the instantaneous values of the signals applied to said first and second inputs of said comparator circuit and for generating an output signal of short duration to indicate the occurrence of a peak value of an input pulse in the said input waveform when the said instantaneous values of said input signals are equal.

2. A system according to claim 1 for generating short duration output signals corresponding to maximum and minimum values in an input waveform which substantially comprises a number of alternate positive and negative pulses, including a pair of complementary comparator circuits each for generating output signals corresponding to the maximum and minimum peak values in the input waveform respectively and a linking device responsive to output signals from each of the comparator circuits for inhibiting the operation of the comparator circuits alternatively.

3. A system according to claim 2 in which a bistable circuit constitutes the linking device and in which an output signal from the first comparator circuit of said complementary pair is arranged to trigger the bistable circuit into its set condition in which it is arranged to inhibit further operation of the said first comparator circuit, and in which an output pulse from the complementary pair is arranged to trigger the bistable circuit into its reset condition in which it inhibits generation of further output pulses by the said second comparator circuit.

References Cited

UNITED STATES PATENTS

| | | | |
|---|---|---|---|
| 2,493,648 | 1/1950 | Walton et al. | 329—115 |
| 3,033,996 | 5/1962 | Atherton | 307—88.5 |
| 3,124,706 | 3/1964 | Alexander | 307—88.5 |
| 3,178,595 | 4/1965 | Cole | 307—88.5 |
| 3,191,073 | 6/1965 | Mooney | 328—150 |
| 3,225,213 | 12/1965 | Hinrich et al. | 328—135 |

FOREIGN PATENTS 565,461  11/1944  Great Britain.

ARTHUR GAUSS, *Primary Examiner.*

B. P. DAVIS, *Assistant Examiner.*